Sept. 24, 1963
W. H. PHILLIPS
3,104,769
DUAL CONTROL CIRCUIT
Filed Oct. 11, 1960
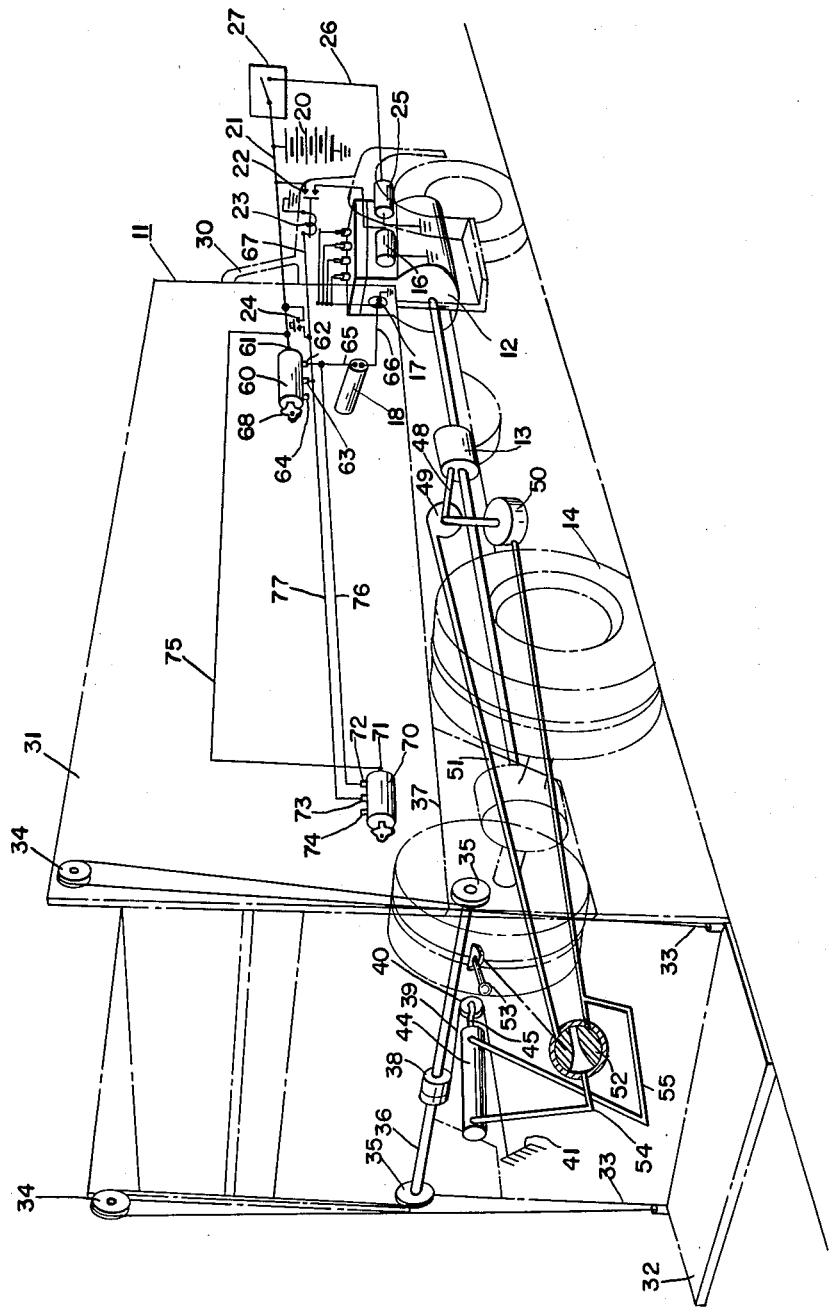
INVENTOR.
WILLIAM H. PHILLIPS
BY *Woodling, Krost,*
*Granger and Rust,*
ATTORNEYS

United States Patent Office 3,104,769
Patented Sept. 24, 1963

3,104,769
DUAL CONTROL CIRCUIT
William H. Phillips, 3395 W. 63rd St., Cleveland, Ohio
Filed Oct. 11, 1960, Ser. No. 61,866
2 Claims. (Cl. 214—75)

The invention relates in general to dual control circuits and more particularly to dual control of a vehicle engine such as a truck engine.

Many commercial vehicles have been made which include some form of elevator or load lifting device to lift a load into a load compartment. These have become more prevalent in recent years as the size of trucks and loads have increased and as labor costs have increased, in order to increase material handling speed and efficiency. Also, several states have regulations forbidding a vehicle operator to leave the vehicle engine running while the vehicle is parked at the curb of a street. At the same time most of these trucks with elevators have a power source derived from the truck engine to operate the elevator. As a result, many times, the truck operator will violate the law in leaving the truck engine running while the truck is stationary at the street curb and while the operator is away from the truck. The operator does this for convenience so that the truck engine will always be running and available to supply power when the truck elevator is needed.

Accordingly, an object of the invention is to provide a safety dual control to comply with the law and to promote safe operation of a vehicle.

Still another object of the invention is to provide a dual control to control a vehicle engine both from the driver compartment and from the load compartment.

Still another object of the invention is to provide a vehicle control system which provides control of the truck engine at the rear of the truck near an elevator tail gate whereat a control for the tail gate is located.

Another object of the invention is to provide a safety control wherein unauthorized persons may not operate an elevator of a truck load compartment.

Other objects and a fuller understanding of this invention may be had by referring to the following description and claims, taken in conjunction with the accompanying drawing in which:

The single FIGURE shows diagrammatically a truck with superimposed thereon electrical and hydraulic circuits incorporating the invention.

The drawing shows the invention incorporated in a truck 11 which may be of any of many types but which, in this embodiment includes an engine 12 operating through a transmission 13 to drive rear wheels 14. The engine has a starter 16 and an ignition system including a distributor 17 and a coil 18. A battery 20 provides power through a conductor 21 and a solenoid switch 22 to the starter 16. A solenoid coil 23 actuates the solenoid switch 22 and is connected through a starter switch 24 to the conductor 21. A generator 25 may be provided on the engine 12 to supply power through conductor 26 and a cut-out switch 27 to the conductor 21 and thus to recharge the battery 20.

The truck 11 is provided with a driver compartment or cab 30 and a load compartment 31. An elevator tail gate 32 is provided for the load compartment 31 as one of many forms of load lifting devices. This tail gate 32 is shown at the rear of the load compartment 31. This tail gate may be raised and lowered in any desired manner and the drawing shows cables 33 attached to this elevator and rising generally vertically to sheaves 34 at the top rear of the load compartment 31 and then extending downwardly to wrap around drums 35 on a shaft 36. This shaft may be just below the floor 37 of the load compartment 31. Another drum 38 is fastened to the shaft 36 and a cable 39 is wrapped around this drum 38 and extends over a sheave 40 and then returns to a fixed point 41 of the load compartment 31. A hydraulic cylinder 44 is one form of a fluid power means and a piston rod 45 in the cylinder 44 is connected to move the sheave 40.

The truck transmission 13 has some form of power take-off 48 to drive a hydraulic pump 49. This pump draws hydraulic fluid from a sump 50 and supplies it under pressure through a conduit 51 to a fluid control valve 52. This control valve has a neutral position as shown and is controlled in movement by a control handle 53 which is positioned within reach of the elevator 32. Counter-clockwise rotation of the control valve 52 will supply pressure fluid through a conduit 54 to the lower end of the hydraulic cylinder 44 to raise the elevator 32. The piston end of the cylinder 44 is connected by a return conduit 55 to the sump 50. Clockwise rotation from neutral of the control valve connects the lower end of cylinder 44 to the return conduit 55 to lower the elevator 32.

The driver compartment 30 includes a primary ignition switch 60 having a first, second, third and fourth terminals 61, 62, 63 and 64, respectively. The first terminal 61 is connected to the conductor 21 and the second terminal 62 is connected by a conductor 65 to the coil 18 and then by a conductor 66 to the distributor 17. The third terminal 63 is connected to a conductor 67 which is connected to the starter solenoid coil 23. The ignition switch 60 is controlled by a key 68 and may be a conventional combined ignition, starter and accessory switch. The terminal 61 is the input terminal, and when the switch is turned to the left in its conventional operation, this input terminal 61 is connected to the accessory terminal 64. This may be for operation of a heater or a two-way radio, for example . . . for radio dispatch of the vehicle. When the key is turned to the right to a first position, the input terminal 61 is connected to both the second and fourth terminals 62 and 64 to energize both the accessories and the ignition circuit. When the key is turned still further to the right to a second position, usually against the urging of a spring, the first input terminal 61 is connected to the third terminal 63 to energize the starter 25. It does this by first closing the starter solenoid switch 22 which in turn energizes the starter 25. As such, the third terminal 63 on switch 60 is an alternative to the starter switch 24 and either may be used, and both are currently in use by different vehicle manufacturers.

An auxiliary combined ignition and starter switch 70 is provided on the load compartment 31 preferably closely adjacent the control handle 53. This auxiliary switch 70 is placed within reach of the elevator 32 and within reach of the control handle 53. The auxiliary switch 70 has first, second, third and fourth terminals 71, 72, 73 and 74 respectively. A conductor 75 connects terminals 61 and 71. A conductor 76 connects terminals 62 and 72 and a conductor 77 connects terminals 63 and 73.

The fourth terminal 74 may be connected by a conductor to the fourth terminal 64 if it is desired to be able to operate accessories from the rear of the truck.

Operation

The truck 11 may be operated in a conventional manner by operating the primary ignition switch 60 to energize the ignition system including the coil 18. The starter switch 24 or starter switch terminal 63 may be closed to energize the starter 16 and hence start the engine 12. Power is drawn from the battery 20 for this purpose and the generator 25 in turn draws power from the engine to recharge the battery. The power take-off 48 is one form of means to obtain power from the engine to operate the elevator 32. In this case via the fluid pump 49 and fluid cylinder 44. Shutting off the primary switch 60 and removing the key 68 shuts off the engine and locks the ignition and starter circuits and hence disables the elevator 32. The vehicle operator may then leave the driver compartment 30 and yet is able to operate the elevator 32 from the rear of the truck. The same key may be used to operate the auxiliary switch 70 to start the engine and to energize the ignition circuit to maintain the engine running. Accordingly the fluid pump 49 is operating so that the control handle 53 may be operated to raise and lower the elevator 32. The auxiliary switch 70 is placed at any convenient location at the rear of the truck and preferably close to the control handle 53 so that when the operator leaves the truck for errands or to obtain additional loads, it is possible to lock the elevator 32. The operator may simply turn off the auxiliary switch 70 and remove the key 68. This, of course, stops the engine and locks it as well as disabling the elevator 32. This promotes safety because the operator is not tempted to leave the engine running as he might be if he had to walk to the cab 30 to stop and start the engine between each trip for another load. Thus, the auxiliary switch 70 promotes safety and compliance with the law of many states to turn off the engine when the vehicle is left stationary at a street curb. This prevents ready stealing of the vehicle. Also, the disabling of the elevator 32 prevents unauthorized persons from operating it. Were the engine 12 left running, then the elevator 32 could easily be operated even by children and such elevators might easily be classed as an attractive nuisance which attracts children and they might easily be hurt in unauthorized operation of the elevator. Accordingly the auxiliary switch 70 helps prevent accidents and incident damage or liability suits.

Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and the scope of the invention as hereinafter claimed.

What is claimed is:

1. An engine dual control for a truck having an elevator to a load compartment remote from a driver compartment, said engine having a battery, an ignition system and a starter, said dual control comprising, in combination, primary key operated ignition switch means in said driver compartment connected in circuit to control energization from said battery to the ignition system, a key to operate said switch means, primary starter switch means in said driver compartment connected in circuit to control energization from said battery to said starter, power means energized from said engine to raise and lower said elevator, control means connected to said power means and located at said load compartment to control operation of said elevator, key operated auxiliary ignition and starter switch means positioned near said control means and operated by said key, and conductors connecting said auxiliary ignition and starter switch means in parallel with said ignition and starter circuits to control energization of same through said battery, whereby, said key may be used to operate said auxiliary ignition and starter switch means to cause starting and running of said engine as an incident to operating said elevator, and subsequent stopping and locking of the engine ignition and starter circuits for safety when the truck operator is away from the truck.

2. An engine auxiliary control for a truck having a load compartment with a tail gate at the rear thereof remote from a driver compartment, said engine having a battery, an ignition system and a starter solenoid to control energization to a starter, said driver compartment having primary key operated ignition switch means connected in circuit to control energization from said battery to the ignition system, a key to operate said switch means, primary starter switch means in said driver compartment connected in circuit to control energization from said battery to said starter solenoid, a hydraulic pump driven from said engine, a hydraulic piston and cylinder connected to raise and lower said tail gate, and a control valve connected between said cylinder and said pump and located within reach of said tail gate to control operation of same, said auxiliary control comprising, in combination, a key operated auxiliary combined ignition and starter switch positioned within reach of said tail gate and within reach of said control valve and operated by said key, and conductors connecting said auxiliary ignition and starter switch in parallel with said primary ignition and starter switch means through said battery, whereby, said primary ignition switch means and said auxiliary ignition switch may be turned off to stop said engine, and whereby said key may be used to operate said auxiliary ignition and starter switch to cause starting and running of said engine as an incident to operating said tail gate, and subsequent stopping and locking of the engine ignition and starting circuits for safety when the truck operator is away from the truck.

References Cited in the file of this patent

UNITED STATES PATENTS 2,761,569     Iserman _____ Sept. 4, 1956

FOREIGN PATENTS 502,177     Belgium _____ Apr. 14, 1951